(12) United States Patent
Laivand et al.

(10) Patent No.: US 9,794,227 B2
(45) Date of Patent: Oct. 17, 2017

(54) AUTOMATIC DETECTION OF AUTHENTICATION METHODS BY A GATEWAY

(71) Applicant: MICROSOFT TECHNOLOGY LICENSING, LLC, Redmond, WA (US)

(72) Inventors: Sharon Laivand, Netanya (IL); Meir Mendelovich, Kfar Saba (IL); Shai Kariv, Sofit (IL); Ran Dolev, Netanya (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/201,780

(22) Filed: Mar. 7, 2014

(65) Prior Publication Data

US 2015/0256514 A1   Sep. 10, 2015

(51) Int. Cl.
*H04L 29/06*   (2006.01)

(52) U.S. Cl.
CPC .......... *H04L 63/0281* (2013.01); *H04L 63/08* (2013.01); *H04L 63/0884* (2013.01);
(Continued)

(58) Field of Classification Search
CPC ......... H04L 63/08; H04L 63/18; H04L 67/02; H04L 63/0884; H04L 63/0815; G06F 2209/542; G06F 9/54; G06F 21/41
(Continued)

(56) References Cited

U.S. PATENT DOCUMENTS 7,475,146 B2 *   1/2009   Bazot et al. ................. 709/227
7,647,404 B2 *   1/2010   Cooper et al. ............... 709/225
(Continued)

FOREIGN PATENT DOCUMENTS

WO        0111845 A2     2/2001

OTHER PUBLICATIONS

"Network Access Control", In Technical Whitepaper, Jan. 5, 2010, 23 pages.
(Continued)

*Primary Examiner* — Oleg Korsak
(74) *Attorney, Agent, or Firm* — Alleman Hall Creasman & Tuttle LLP (57) ABSTRACT

Disclosed herein is a system and method for allowing access to secure resources through a gateway without having to pre-configure the gateway with each specific URL that access is to be granted as well as maintaining the list of resources that are exposed. The gateway is configured to take incoming requests from client devices, such as the URL, and determine from the URL itself what type of authentication is required to gain access to the resource as opposed to comparing the URL with a managed list of URL's. Once the authentication process is identified by the gateway that process is implemented. The gateway analyzes the responses from the resources that may include denials or user authentication requests from the resource to determine the authentication process to use to gain access to the resource. Once authenticated the communications traffic between the client/user and the resource is permitted through the gateway.

18 Claims, 3 Drawing Sheets

(52) U.S. Cl.
CPC ............ *H04L 63/105* (2013.01); *H04L 63/20* (2013.01); *H04L 63/0807* (2013.01)

(58) Field of Classification Search
USPC .......................................................... 726/3
See application file for complete search history.

(56) References Cited

U.S. PATENT DOCUMENTS

| | | | |
|---|---|---|---|
| 8,312,154 B1* | 11/2012 | Cabrera et al. | 709/229 |
| 8,418,238 B2* | 4/2013 | Platt et al. | 726/8 |
| 8,700,771 B1* | 4/2014 | Ramankutty | H04L 63/101 |
| | | | 370/389 |
| 2009/0300739 A1 | 12/2009 | Nice et al. | |
| 2010/0107225 A1 | 4/2010 | Spencer et al. | |
| 2010/0242092 A1 | 9/2010 | Harris et al. | |

OTHER PUBLICATIONS

"Unified Access Control", Published on: May 23, 2013, Available at: http://www.juniper.net/us/en/local/pdf/datasheets/1000137-en.pdf, 11 pages.

"A Unified Approach for Securing Wireless, Remote, and Internal LAN Access", In Technical Whitepaper, Nov. 12, 2013, 15 pages.

"International Search Report and Written Opinion Issued in PCT Application No. PCT/US2015/018559", Mailed Date: Jul. 1, 2015, 9 Pages.

IPEA European Patent Office, Second Written Opinion Issued in Application No. PCT/US2015/018559, Feb. 17, 2016, WIPO, 6 pages.

IPEA European Patent Office, International Preliminary Report on Patentability issued in PCT Application No. PCT/US2015/018559, Jun. 1, 2016, WIPO, 7 pages.

* cited by examiner

AUTOMATIC DETECTION OF AUTHENTICATION METHODS BY A GATEWAY

TECHNICAL FIELD

This description relates generally to the management of the access to secure resources from a client device through a gateway that separates two networks.

BACKGROUND

Corporations and other entities often have a number of resources and applications that are maintained on their own private secure networks. These resources are often mission critical or have large business impact to the entity. As such these resources are protected from access through the use of authentication methods and processes. This ensures that users who wish to access them are authenticated prior to granting access to the resource.

When a user attempts to access the resource from within the secure network the resource can ensure that the user has the correct credentials to access the resource. In some instances simply being on the secure network is enough. In other cases additional authentication or pre-authentication is needed. This level of authentication can easily be handled by the resources inside the network on their own.

However, in today's world entities often want to make internal resources available to users outside of the internal network while still maintaining or even increasing the level of security required for a user to access the resource from an outside network. In order to achieve this protection the administrator of the internal network must pre-configure a gateway, such as a proxy server or firewall, with information for each resource that they wish to allow access to from the outside. This includes providing the gateway with the specific authentication requirements for the resource. A user attempting to access the resource will provide to the gateway the uniform resource locator or URL for the specific resource that they wish to access. The gateway looks for the specific URL and applies the pre-configured process to the incoming request. As each individual URL must be separately configured at the gateway the administrator is required to keep the list of resources up to date as well as the specific configurations for each resource up to date as well. This is a time consuming and burdensome process for the administrator.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a system and method for allowing access to secure resources through a gateway without having to pre-configure the gateway with each specific URL that access is to be granted as well as maintaining the list of resources that are exposed. The gateway is configured to take incoming requests from client devices, such as the URL, and determine from the URL itself what type of authentication is required to gain access to the resource as opposed to comparing the URL with a managed list of URL's. Once the authentication process is identified by the gateway that process is implemented by for example redirecting the client to the authentication service, obtaining the authentication on behalf of the client from the authentication service (such as impersonating the service or resource), or by passing the request through to the resource. The gateway is also able to analyze the responses from there resources that may include denials from the resource to determine the authentication process to use for the user to gain access to the resource. Once the user is authenticated the communications traffic between the client/user and the resource is permitted through the gateway.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Figure 1:
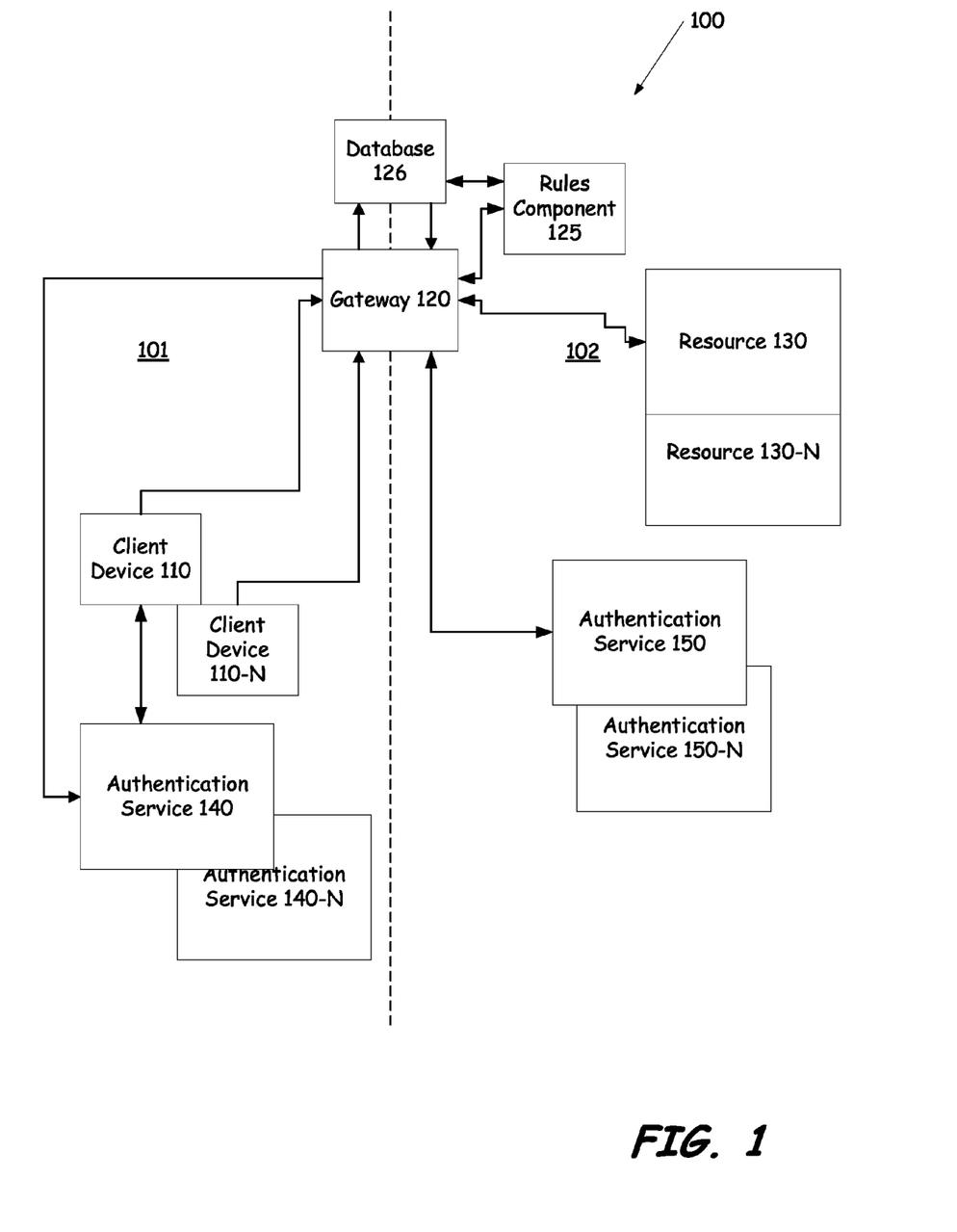
FIG. 1 is a block diagram illustrating components of the enhanced indexing system according to one illustrative embodiment.

FIG. 1 is a block diagram illustrating components of a security system 100 configured to detect automatically a scenario type for allowing traffic to pass through a gateway 120 such as a proxy or firewall according to one illustrative embodiment. System 100 includes a client device 110, a gateway 120, a secure resource 130, a first authentication service 140 and a second authentication service 150. In one embodiment of the system 100 a portion of the components are on a public or non-secure side 101 of the gateway 120 and a portion of the components are on a secure side 102 of the gateway 120.

The secure side 102 of the gateway 120 is a network that is protected from outside access by the gateway 120. Applications and documents often reside on the secure side 102 of the gateway 120 that are not intended to be accessible by the general public and may be protected by one or more authentication methods to ensure that only authorized persons are able to access the information. In one embodiment the secure side 102 of the gateway 120 represents a corporate network. Also while the terms secure side 102 and non-secured side are used herein, it should be noted that the secure side 102 could be further divided into additional levels where each level has its own gateway 120 separating it from the secure side 102. Thus, multiple networks and gateway 120s may be present to control access or provide increasing levels of protection.

The non-secure side 101 of the gateway 120 is any network that has been separated from the secure side 102. In one embodiment the non-secure side 101 is a public network such as Wi-Fi hotspot commonly found in a coffee shop or other public place. In another embodiment the non-secure side 101 is a home or hotel network that has devices connected to it that are not part of the secure side 102 of the gateway 120. In another embodiment, the non-secure side 101 is a public cellular network with many devices connected to the network that are not authorized to access the secure side 102 of the gateway 120. In yet another embodiment the non-secure side 101 of the network is a combination of different networks that all have the ability to connect to the gateway 120.

The client device 110 is in one embodiment a portable or mobile device that is used by a user to connect back to secure components and resource 130s on the secure side 102 of the gateway 120 from the non-secure side 101 of the gateway 120. Client device 110 can be a mobile phone, a tablet computer, a laptop computer, a desktop computer or any other computing device that can connect to a network and communicate with the gateway 120. In some embodiments the client device 110 may be a virtual or virtualized version of the aforementioned computing devices. The client device 110 may include an operating system 100 that requires the user to provide authentication for access to the client device 110 or to access components of the client device 110. Further, the client device 110 may include applications that connect to resource 130s on the secure side 102 of the gateway 120. These applications can include word processing applications, spreadsheet applications, browser application or any other application that can receive data from the secure side 102 of the gateway 120 and present or consume the data on the non-secure side 101 of the gateway 120. While only one client device 110 is illustrated in FIG. 1 it should be recognized that the present embodiments can be implemented with a plurality of devices all or some of which are connecting or attempting to connect to the secure side 102 through the gateway 120.

The gateway 120 is a component of the system 100 that controls the flow of information between the non-secure side 101 and the secure side 102. In one embodiment the gateway 120 is a proxy server. In another embodiment the gateway 120 is a firewall. In yet another embodiment, the gateway 120 is a reverse proxy such as a web application proxy. The gateway 120 receives requests for resource 130s from the client device 110 and functions differently based on the type of request that is received from the client device 110. Upon receipt of a request from a client device 110 the gateway 120 analyzes the request to determine what type of request or scenario the request is. In one embodiment this analysis is performed by a pre-authentication rules component 125. The gateway 120 determines, according to one illustrative embodiment, if the request is a configured as a pass through request, if the request contains information in the header of the request, or if the request causes a specific response to be received back from the resource 130. However, in other embodiments, depending on the scenarios supported by the gateway 120 other information can be used by the pre-authentication rules component 125 to identify the scenario associated with the request.

The pre-authentication rules component 125 is in one embodiment a component of the gateway 120 that is configured to analyze the incoming request from the client device 110 and determine which pre-authentication rule or procedure to apply to the request. However, in other embodiments, the pre-authentication rules component 125 can be a separate component or a service that the gateway 120 is connected with. The pre-authentication rules component 125 also receives communications and/or responses from the resource 130 that are based on the received requests. These responses from the resource 130 are also analyzed by the pre-authentication rules component 125 to determine which rules or procedures to apply to the request. The pre-authentication rules component 125 looks at the initial request from the client device 110 and determines if the request is a request for a resource 130 that requires pre-authentication. In some embodiments the pre-authentication rules component 125 can identify that the pre-authentication is required by the content of a header in the request. In these embodiments, the pre-authentication rules component 125 identifies in the request that a pre-authentication token or claim is required. Based on the format of the header and the location of the token or other information that describes where the token should be the rules component 125 access a database 126 or list of authentication rules and matches the token information with the rule. The associated rule is then applied to the request. Depending on the nature of the rule the rule may cause the request to be diverted to one of the authentication services either inside the secure side 102 of the gateway 120 or on the non-secure side 101 of the gateway 120. Once the client device 110 has received the appropriate token for the resource 130 the gateway 120 will then allow the request to be transmitted to the resource 130.

In another embodiment the pre-authentication rules component 125 cannot determine from the request if authentication is required by the resource 130, either because the request does not indicate that authentication is required, authentication is not required, or a corresponding rule cannot be found in the database 126. In this embodiment the request is simply passed on to the resource 130 for processing and fulfillment. However, because the resource 130 does require pre-authentication the resource 130 responds back with an error indicating that the required pre-authentication was not included with the requests. The error is received by the pre-authentication rules component 125 and is then compared with database 126 of rules to determine how the gateway 120 should respond. Upon finding a rule in the database 126 that matches the returned error, the pre-authentication rules component 125 provides the rule to the gateway 120 for the gateway 120 to execute. The rule may cause, in one embodiment, the gateway 120 to impersonate the features of the resource 130 to elicit responses from the client device 110 and perform the authentication similar to the way the resource 130 would perform the authentication if the gateway 120 were not disposed between the two. In another embodiment the rule may cause the gateway 120 to redirect the client device 110 to the appropriate authentication component to complete the authentication. Once the client device 110 has completed the required authentication process the gateway 120 processes the request to the resource 130 and the client device 110 is able to access the resource 130.

Through the pre-authentication rules component 125 the gateway 120 is able to process requests from various client device 110s for various resource 130s that each implement different authentication and pre-authentication methods. The rules component 125 allows administrators to not worry or concern themselves with ensuring that the gateway 120 is configured to implement the authentication procedures for each site that the administrator has protected. The gateway 120 is configured to process each type of authentication method without having the specific resource 130 (or resource 130 location) pre-defined at the gateway 120.

The secure resource 130 is in one embodiment a server, a service, an application, a web site, a document or any other resource 130 that an administrator or corporation desires to permit access to through the gateway 120 but enforces a security level on the resource 130. The resource 130 may be protected by any protocol or method of securing a resource 130. In some embodiments the resource 130 may not be protected on the secure side 102 of the gateway 120 for clients who are located on the secure side 102 as well, such as when the user accesses the resource 130 over a virtual private network or from an onsite location, but is protected when the user attempts to access the resource 130 from the non-secure side 101. For example secure resource 130 could be a SharePoint site that is configured to provide information to certain users. The SharePoint site may require that the user present an authentication certificate to access the content. In another example the secure resource 130 could be an application such as an application from the Windows Store. In one embodiment this application may be protected or require OAuth 2.0 authentication in order for the user to gain access to the application on the secure side 102 of the gateway 120. However, other authentication methods may be implemented. In another example the resource 130 is a site accessed through a browser that requires claims to be made from a token generated by a federated service, such as Active Directory, or an authentication protocol such as the protocols implemented by Integrated Windows Authentication.

First authentication service 140 is an authentication service that is located on the non-secure side 101 of the gateway 120 such that the client device 110 can access the service and receive from the service a token or other claim that can be presented to the gateway 120 and the secure resource 130 in order to gain access to the secure resource 130. The first authentication service 140 can implement any security protocol or method available. The client device 110 can either directly interface with the first authentication service 140 or it can interface with the first authentication service 140 through the gateway 120.

The second authentication service 150 is an authentication service that is located on the secure side 102 of the gateway 120 such that the client device 110 can only access the second authentication service 150 through the gateway 120. Again similar to the first authentication service 140 the second authentication service 150 can implement any security protocol or method available. In one embodiment, the second authentication service 150 is an Active Directory Federated Service that provides credentials and tokens associated with the user of the client device 110. The client device 110 accesses the second authentication service 150 as a result of the gateway 120 redirecting the client device 110 to the second authentication service 150. Because the gateway 120 is disposed between the client device 110 and the second authentication service 150, the client is not able to directly interact with the service. In this way the gateway 120 is able to limit access to the second authentication service 150 from the non-secure side 101.

Figure 2:
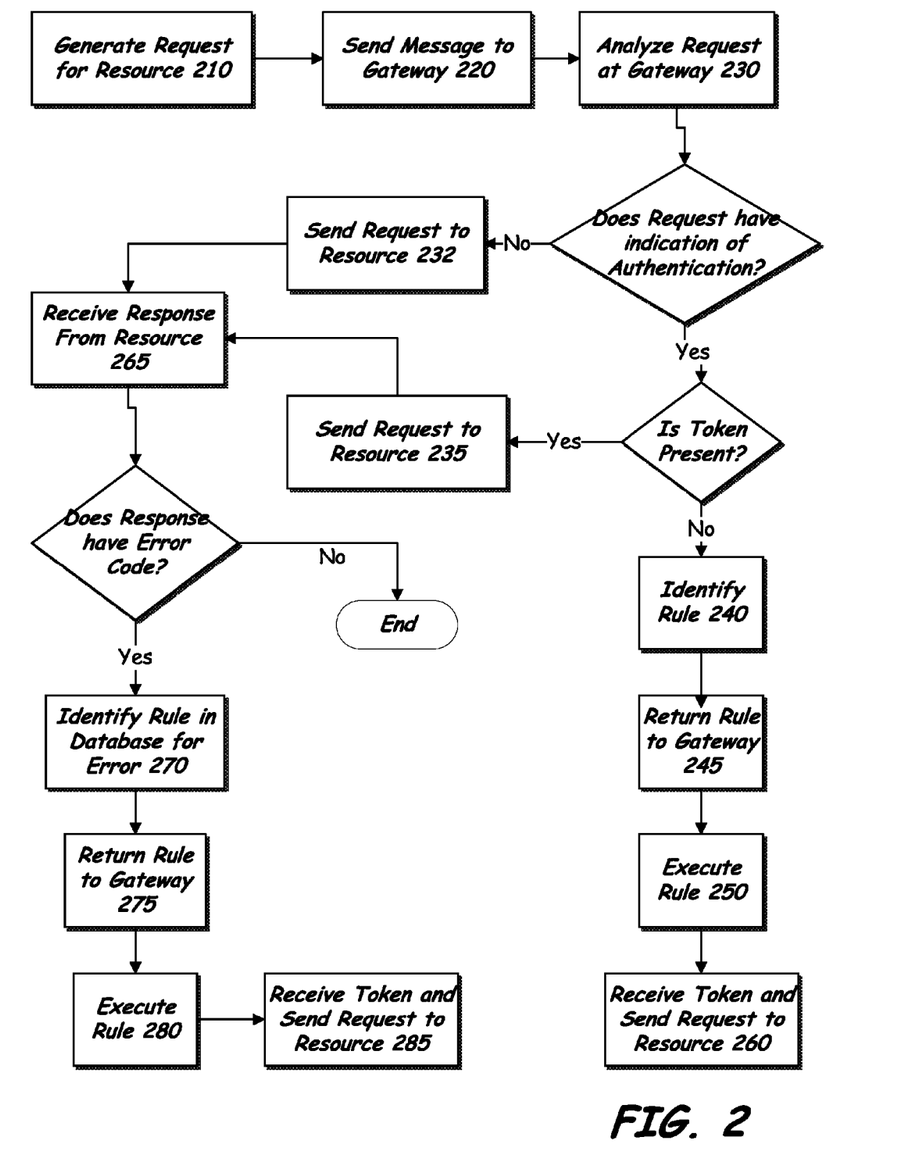
FIG. 2 is a block diagram illustrating an analyzer using a number of filters to generate the enhanced index according to one illustrative embodiment.

FIG. 2 is a flow diagram illustrating a process used by the gateway 120 in processing a request from a client device 110 for a secure resource 130 according to one illustrative embodiment. A user of the client device 110 begins the process by accessing an application, entering into a browser, opening a document or performing any action that requires the client device 110 to access a resource 130 on the secure side 102 of the gateway 120. This is illustrated at step 210.

This action of the user at step 210 causes the client device 110 to communicate with the gateway 120. The client device 110 sends to the gateway 120 a uniform resource 130 locator (URL) or other message that indicates to the gateway 120 the specific resource 130 that the user of the client device 110 is attempting to access. This is illustrated at step 220.

Upon receipt of the request from the client the gateway 120 analyzes the request. This is illustrated at step 230. During this analysis the gateway 120 determines if the request includes information that indicates that the resource 130 is protected by an authentication mechanism that requires pre-authentication of the user. In contrast to typically system 100s where the gateway 120 looks up the URL in a database 126 to determine if the resource 130 requires authentication and what authentication is required, the gateway 120 analyzes the URL and determines if a portion of the URL includes a specific header that indicates that authentication is required. For example, a request may include an indication that the resource 130 requires or accepts a forms based authentication such as the MS-OFBA (Microsoft Office Forms Based Authentication). In another example the header may indicate that the desired resource 130 is an application that includes an authorization header and a bearer token, which may or may not be present in the request. However, other indications of the need for authentication may be a component of the URL.

If there is no indication in the header the gateway 120 passes the request to the resource 130. This is illustrated at step 232. The indication may not be detectable from the header for a number of reasons. For example the request may be for a resource 130 on the secure side 102 that is not protected or intentionally accessible from the outside such as if the resource 130 is a support document. These are commonly called pass-through resource 130s. In other examples the resource 130 may require authentication, but the gateway 120 is unable to know that it requires authentication or the method of authentication until the resource 130 has responded back to the client through the gateway 120.

If the gateway 120 determines that the header includes the indication that authentication is required to access the resource 130, the gateway 120 determines if the authentication token is present in the request or the associated communication. If the gateway 120 determines that the authentication token is present the request is passed through to the resource 130. This is illustrated at step 235.

If the authentication token is not present, the gateway 120 then accesses a database 126 of rules to determine how to respond to the client request. This is illustrated at step 240. The gateway 120 may pass the request or the portion of the request to the pre-authentication rules component 125 which identifies the particular authentication method that is required for the resource 130. The pre-authentication rules component 125 then provides back to the gateway 120 the process that is required for the identified authentication method. This is illustrated at step 245.

The gateway 120 then takes the process that was provided by the pre-authentication rules component 125 and executes the provided process. This is illustrated at step 250. Each authentication method has its own unique process that is executed to authenticate the user or device. In some instances the process will cause the gateway 120 to impersonate the resource 130 to gather the information required for the authentication. In other instances the gateway 120 will redirect the client device 110 to either the first authentication service 140 of the second authentication service 150 to receive the appropriate token or pre-authentication.

Once the authentication token has been received or the process completed the gateway 120 then completes the original request. This is illustrated at step 260. This process may include merging the authentication token with the original request. Alternatively, the gateway 120 may provide the token back to the client device 110 and have the client device 110 resubmit the request with the authentication token included in the request. The request is then forwarded to the secure resource 130 and the client device 110 is able to interact with the resource 130 or consume the contents of the resource 130.

If the gateway 120 was not able to determine if authentication was required at step 230 and forwarded the request to the resource 130 at step 232, the gateway 120 does nothing more until such time as the resource 130 responds at step 265. The resource 130 may respond to the request from the client device 110 by issuing an error that indicates that authentication that was required was not presented with the request. For example the resource 130 may respond to a request from a browser with an HTTP response of "401" or "407" indicated that the authentication was not present. In another example the resource 130 may respond with an HTTP response of "302" indicating that the request needs to be redirected to a different location. These are only examples of responses that could be received from the resource 130 indicating that authentication is required.

The gateway 120 consumes the error code that was received from the resource 130 at step 265 and determines if the error code or indication has a corresponding entry in the rules database 126, such as the rules contained in the pre-authentication rules component 125. This is illustrated at step 270. If a match to the error code is found by the rules component 125 the process associated with that error code is provided to gateway 120. This is illustrated at step 275.

The gateway 120 then takes the process that was provided by the pre-authentication rules component 125 and executes the provided process. This is illustrated at step 280. As each authentication method has its own unique process that is executed to authenticate the user or device. For example, in some embodiments, when the error code is "302" the process provided by the rules component 125 may instruct the redirection to the second authentication service 150. However as the second authentication service 150 is located on the secure side 102 of the gateway 120, the gateway 120 may impersonate the second authentication service 150 and present that information to the user of the client device 110. In this way the client device 110 responds to the request to the gateway 120, after which the gateway 120 interacts with the second authentication service 150 by presenting the information gathered from the client and then obtaining the correct token. In the example where the response from the resource 130 was "401" or "407" the rules component 125 may simply instruct the gateway 120 to direct the user to the corresponding authentication service to obtain the authentication token.

Once the authentication token has been received or the process completed the gateway 120 then completes the original request. This is illustrated at step 285. This process may include merging the authentication token with the original request. Alternatively, the gateway 120 may provide the token back to the client device 110 and have the client device 110 resubmit the request with the authentication token included in the request. The request is then forwarded to the secure resource 130 and the client device 110 is able to interact with the resource 130 or consume the contents of the resource 130.

Figure 3:
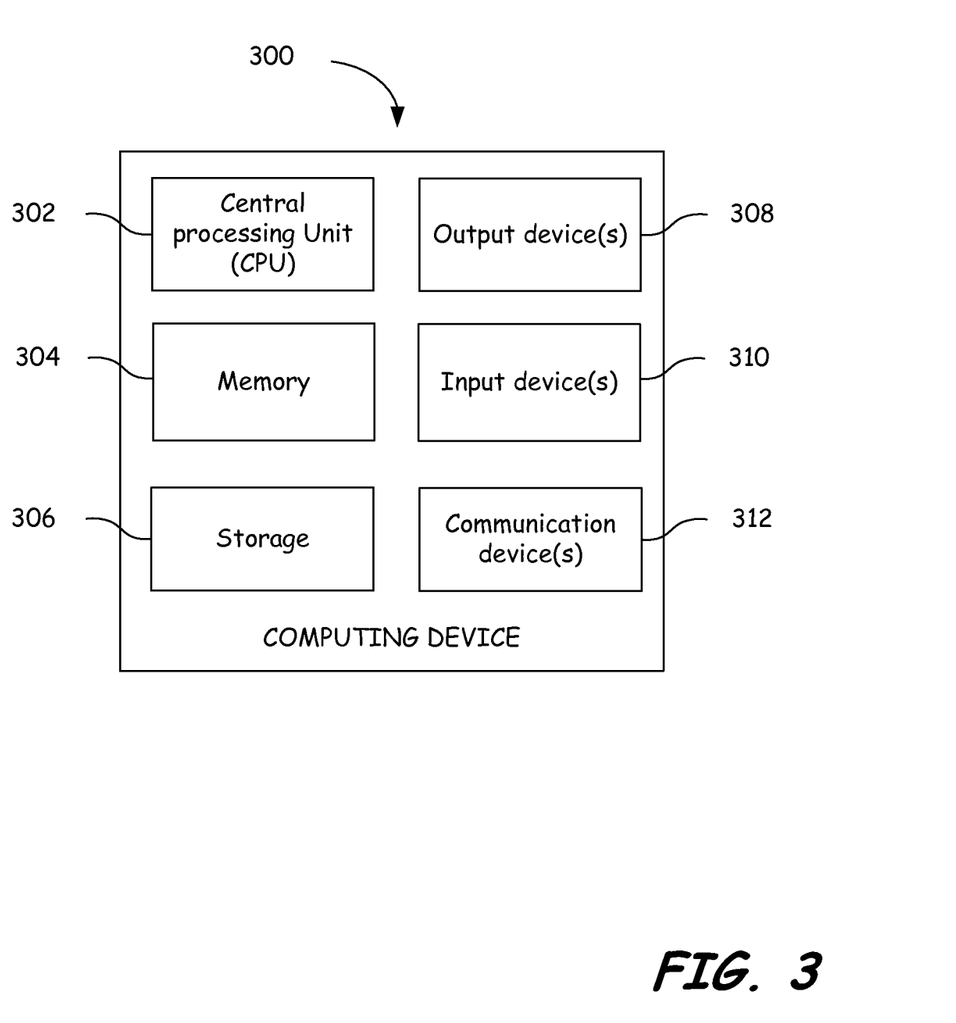
FIG. 3 is a block diagram illustrating a computing device which can implement the enhanced indexing system according to one embodiment.

FIG. 3 illustrates a component diagram of a computing device according to one embodiment. The computing device 300 can be utilized to implement one or more computing devices, computer processes, or software modules described herein. In one example, the computing device 300 can be utilized to process calculations, execute instructions, receive and transmit digital signals. In another example, the computing device 300 can be utilized to process calculations, execute instructions, receive and transmit digital signals, receive and transmit search queries, and hypertext, compile computer code, as required by the system of the present embodiments. Further, computing device 300 can be a distributed computing device where components of computing device 300 are located on different computing devices that are connected to each other through network or other forms of connections. Additionally, computing device 300 can be a cloud based computing device.

The computing device 300 can be any general or special purpose computer now known or to become known capable of performing the steps and/or performing the functions described herein, either in software, hardware, firmware, or a combination thereof.

In its most basic configuration, computing device 300 typically includes at least one central processing unit (CPU) or processor 302 and memory 304. Depending on the exact configuration and type of computing device, memory 304 may be volatile (such as RAM), non-volatile (such as ROM, flash memory, etc.) or some combination of the two. Additionally, computing device 300 may also have additional features/functionality. For example, computing device 300 may include multiple CPU's. The described methods may be executed in any manner by any processing unit in computing device 300. For example, the described process may be executed by both multiple CPU's in parallel.

Computing device 300 may also include additional storage (removable and/or non-removable) including, but not limited to, magnetic or optical disks or tape. Such additional storage is illustrated in FIG. 4 by storage 306. Computer storage media includes volatile and nonvolatile, removable and non-removable media implemented in any method or technology for storage of information such as computer readable instructions, data structures, program modules or other data. Memory 304 and storage 306 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 300. Any such computer storage media may be part of computing device 300.

Computing device 300 may also contain communications device(s) 312 that allow the device to communicate with other devices. Communications device(s) 312 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 300 may also have input device(s) 310 such as keyboard, mouse, pen, voice input device, touch input device, etc. Output device(s) 308 such as a display, speakers, printer, etc. may also be included. All these devices are well known in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method for implementing an authentication mechanism at a gateway comprising:
   receiving a request for a first resource and a request for a second resource at the gateway;
   analyzing, at the gateway, each of the request for the first resource and the request for the second resource for an indication that the first resource or the second resource requires authentication, wherein analyzing the request is performed without comparing the first resource or the second resource to a list of resources;
   when the request for the first resource is determined at the gateway to contain an indication that the first resource requires authentication, then
      accessing an authentication rules database to identify an authentication process associated with the indication that the first resource requires authentication,
      executing the authentication process associated with the indication that the first resource requires authentication, and
      forwarding from the gateway the request to the first resource following the execution of the authentication process;
   when the request for the second resource is determined at the gateway to contain an indication that the second resource requires authentication, then
      accessing the authentication rules database to identify an authentication process associated with the indication that the second resource requires authentication,
      executing the authentication process associated with the indication that the second resource requires authentication, and
      forwarding from the gateway the request to the first resource following the execution of the authentication process; and
   when the request for the first resource is determined at the gateway not to contain the indication that the first resource requires authentication, then forwarding from the gateway the request to the first resource without execution of the authentication process; and wherein the preceding steps are performed by at least one processor.

2. The method of claim 1 wherein executing the authentication process further comprises:

redirecting the client device to an authentication service for authentication.

3. The method of claim 2 wherein the authentication service is located on a non-secure side of the gateway.

4. The method of claim 2 wherein the authentication service is located on a secure side of the gateway.

5. The method of claim 1 wherein each request includes a header and the indication comprises a portion of the header.

6. The method of claim 1 further comprising:

receiving a response from the first resource indicating that authentication is required, the response having a second indication indicating a type of authentication required by the first resource;

accessing the authentication rules database to identify a second authentication process associated with the second indication from the plurality of different authentication processes; and executing the second authentication process.

7. The method of claim 6 wherein executing the second authentication process further comprises:

querying by the gateway the client device for information required to authenticate the client device;

receiving from the client device the information;

forwarding the received information from the client device to an authentication service; and receiving from the authentication service an authentication token.

8. The method of claim 6 wherein executing the second authentication process further comprises:

redirecting the client device to an authentication service; and receiving from the client device an authentication token.

9. The method of claim 1 wherein prior to forwarding the request to the first resource, further comprising:

receiving a second request from the client device, the second request including an authentication token obtained from the authentication process.

10. A system for controlling access from a client device to a resource comprising:

at least one processor and at least one memory;

a rules database storing at least two different authentication processes; and a gateway separating a first network from a second network, the gateway configured to receive requests from the client device on the first network for a first resource and a second resource on the second network and to select an authentication process from the rules database for each of the first resource and the second resource based on at least a portion of each request, and the gateway configured to analyze each request without comparing each resource to a list of resources, wherein the at least a portion of each request indicates that each of the first resource and the second resource on the second network requires authentication.

11. The system of claim 10 wherein the gateway is a proxy server.

12. The system of claim 10 wherein the gateway is a firewall.

13. The system of claim 10 further comprising:

a rules component configured to select the authentication process from each request from the at least two different authentication processes and to provide the authentication process to the gateway.

14. The system of claim 10 wherein the gateway is further configured to:

analyze a response received from each resource to select the authentication process based on at least a portion of the response.

15. The system of claim 10 wherein the authentication process instructs the gateway to impersonate an authentication service by eliciting responses from the client device that correspond to the process used by the impersonated authentication service and to provide those responses to the authentication service.

16. The system of claim 10 wherein the authentication process instructs the gateway to redirect the client device to an authentication service.

17. The system of claim 10 further comprising:

at least two different authentication services, each of the at least two authentication services configured to generate a different type of authentication.

18. A computer readable storage device having computer executable instructions that when executed cause at least one computing device to:

receive requests for at least two different resources disposed on a second network from a client device disposed on a first network, each request having a corresponding resource of the at least two resources;

analyze each request for the at least two different resources to determine if each of the requests contains an indication that the at least two different resources require authentication, wherein analyzing the requests is performed without comparing the at least two different resources requested to a list of resources;

when the requests for the at least two different resources are determined at a gateway to contain the indications that the at least two different resources require authentication, then access an authentication rules database having a plurality of different authentication processes to identify an authentication process associated with each indication, and execute the authentication process associated with each indication for each of the requests; and when the requests for the at least two different resources are determined at the gateway not to contain the indications that the at least two different resources require authentication, then forward each of the requests to the corresponding resources following the execution of the identified authentication process.

* * * * *